United States Patent
Braun

(10) Patent No.: US 8,842,831 B2
(45) Date of Patent: Sep. 23, 2014

(54) AUTHENTICATION OF AN RFID TAG USING AN ASYMMETRIC CRYPTOGRAPHY METHOD

(75) Inventor: Michael Braun, München (DE)

(73) Assignee: Siemens Aktiengesellschaft, Munich (DE)

(*) Notice: Subject to any disclaimer, the term of this patent is extended or adjusted under 35 U.S.C. 154(b) by 30 days.

(21) Appl. No.: 13/322,622

(22) PCT Filed: Mar. 23, 2010

(86) PCT No.: PCT/EP2010/053732
§ 371 (c)(1),
(2), (4) Date: Feb. 6, 2012

(87) PCT Pub. No.: WO2010/136230
PCT Pub. Date: Dec. 2, 2010

(65) Prior Publication Data
US 2012/0128157 A1 May 24, 2012

(30) Foreign Application Priority Data
May 27, 2009 (DE) .......... 10 2009 022 850

(51) Int. Cl.
*H04K 1/00* (2006.01)
*H04L 9/32* (2006.01)
*G06F 21/44* (2013.01)

(52) U.S. Cl.
CPC ............ *H04L 9/3271* (2013.01); *H04L 9/3247* (2013.01); *G06F 21/445* (2013.01); *H04L 2209/805* (2013.01)
USPC ....................................... 380/270

(58) Field of Classification Search
CPC ..... H04W 12/02; H04W 12/06; H04W 12/04; H04L 63/0428
USPC ............................................. 380/270
See application file for complete search history.

(56) References Cited

U.S. PATENT DOCUMENTS

| 7,309,011 | B2 | 12/2007 | He ............................... 235/385 |
| 8,224,852 | B2* | 7/2012 | Falk et al. ..................... 707/784 |

(Continued)

FOREIGN PATENT DOCUMENTS

| DE | 102006040228 A1 | 3/2008 | ............ B60R 16/02 |
| DE | 102007026836 A1 | 12/2008 | ............... G07D 7/00 |

(Continued)

OTHER PUBLICATIONS

Torii, Naoya et al., "Technologies of Secure Identification Devices," Fujitsu, vol. 54, No. 4, 6 pages (Japanese w/ English abstract), Jun. 7, 2003.

(Continued)

*Primary Examiner* — Jason K. Gee
*Assistant Examiner* — Sanchit Sarker
(74) *Attorney, Agent, or Firm* — King & Spalding L.L.P.

(57) ABSTRACT

A method for the authentication of an RFID tag uses an asymmetric cryptography method which ensures protection against the recycling of authentication RFID tags and needs no deactivation of the corresponding RFID tag for this purpose. To this end, the certificate of an RFID tag to be checked is not stored on the RFID tag but is stored physically separately from the RFID tag. Firstly, the RFID reader reads the certificate of the RFID tag to be checked before the challenge-response protocol is carried out successfully with the RFID tag to be checked. Consequently, an RFID tag can be reused for authentication only when the certificate relating to this RFID tag is known.

12 Claims, 2 Drawing Sheets

(56) References Cited

U.S. PATENT DOCUMENTS

| | | | |
|---|---|---|---|
| 8,751,806 B1* | 6/2014 | Adler et al. | 713/168 |
| 2004/0068470 A1* | 4/2004 | Klyne | 705/50 |
| 2006/0210082 A1* | 9/2006 | Devadas et al. | 380/277 |
| 2007/0057768 A1* | 3/2007 | Zeng et al. | 340/10.1 |
| 2007/0063055 A1* | 3/2007 | Graf et al. | 235/492 |
| 2007/0106897 A1* | 5/2007 | Kulakowski | 713/171 |
| 2007/0206786 A1* | 9/2007 | Chakraborty | 380/30 |
| 2008/0011822 A1* | 1/2008 | Ackley et al. | 235/375 |
| 2008/0024268 A1* | 1/2008 | Wong et al. | 340/5.8 |
| 2008/0106371 A1* | 5/2008 | Tseng et al. | 340/5.8 |
| 2008/0164976 A1* | 7/2008 | Griffiths-Harvey et al. | 340/10.1 |
| 2008/0168270 A1* | 7/2008 | Kulakowski et al. | 713/168 |
| 2008/0244714 A1* | 10/2008 | Kulakowski et al. | 726/5 |
| 2010/0011212 A1* | 1/2010 | Anemikos et al. | 713/171 |
| 2010/0308978 A1* | 12/2010 | Brown | 340/10.42 |
| 2011/0001606 A1* | 1/2011 | Charych | 340/5.7 |
| 2012/0154111 A1* | 6/2012 | Schattleitner et al. | 340/5.8 |

FOREIGN PATENT DOCUMENTS

| | | | | |
|---|---|---|---|---|
| DE | 102007034527 A1 | 2/2009 | | B65D 25/20 |
| EP | 1703478 A2 | 9/2006 | | G07F 17/32 |
| JP | 2002091300 A | 3/2002 | | G09C 1/00 |
| JP | 2004272816 A | 9/2004 | | G06F 12/14 |
| JP | 2006115162 A | 4/2006 | | G06K 17/00 |
| JP | 2008282274 A | 11/2008 | | G06Q 10/00 |
| JP | 2008542916 A | 11/2008 | | G06K 17/00 |
| KR | 10-2009-0030953 | * | 4/2009 | |
| WO | 2006/037220 A1 | 4/2006 | | G07F 17/32 |
| WO | 2007/027151 A1 | 3/2007 | | G06K 19/07 |

OTHER PUBLICATIONS

German Office Action, German patent application No. 10 2009 022 850.0-31, 4 pages, Nov. 23, 2009.

International PCT Search Report and Written Opinion, PCT/EP2010/053732, 13 pages, Jul. 7, 2010.

* cited by examiner

AUTHENTICATION OF AN RFID TAG USING AN ASYMMETRIC CRYPTOGRAPHY METHOD

CROSS-REFERENCE TO RELATED APPLICATIONS

This application is a U.S. National Stage Application of International Application No. PCT/EP2010/053732 filed Mar. 23, 2010, which designates the United States of America, and claims priority to German Application No. 10 2009 022 850.0 filed May 27, 2009. The contents of which are hereby incorporated by reference in their entirety.

TECHNICAL FIELD

The invention relates to a method and system for authentication of an RFID tag using an asymmetric cryptography method, which is especially suitable for preventing RFID tag recycling for product counterfeiting.

BACKGROUND

Counterfeit products are becoming an ever greater problem with great economic implications, extending as far as danger to human health. In the case of counterfeited medicines there is even a danger to human life.

To counter counterfeit medicines and recognize counterfeit medicines in circulation, in addition to characteristics that are difficult to copy, such as watermarks, seals or special color markings for example, so-called auto ID (Identification) technologies such as barcodes or RFID (Radio Frequency Identification) systems are used. In such cases there are in particular two approaches that are followed to detect counterfeit medicines with certainty.

The first approach is based on a track-and-trace system in which the movements of a medicine are logged within the whole logistics chain. In such cases a globally unique serial number known as the Electronic Product Code (EPC) is read automatically by means of barcode or RFID and written into a central database when goods are dispatched and received. In order to now check whether an original medicine is involved, the data in the database is checked for consistency. If for example the same serial number occurs at two different locations at the same time, it is highly likely that the medicine has been counterfeited. However this approach has the problem of all participants in the delivery chain having to support this central database infrastructure.

The second approach is based on a cryptographic authentication of the RFID tags. Conventional RFID chips with a serial number can be cloned easily by personalizing other RFID chips with precisely this serial number. Ultimately it is impossible to distinguish any longer between the original and the cloned RFID chip. Cryptographic RFID chips on the other hand use a cryptographically-secured authentication and can thus securely prevent the cloning of authentication information. To this end the RFID chip is no longer a pure data memory but automatically executes cryptographic algorithms which require the knowledge of secret key information. A particular advantage of this process is the authentication by means of asymmetric cryptographic methods in which no secret information is necessary in the RFID reader itself in order to perform the check. The RFID reader merely needs the public signature key of the brand manufacturer to check any given RFID chip in order to thus be able to check the validity of the individual public key received from the RFID chip. In decentralized infrastructures in particular there is thus the option of verifying the authenticity of RFID chips and thus also of the product, without any complex central key management or an online transaction being necessary to do this.

However the disadvantage of this is that the RFID tags have to be deactivated after use. Otherwise the RFID tags from discarded blisters of an original medicine could be released and used again with a counterfeit medicine. A consequentially necessary deactivation by physical or protocol means, in addition to the technical outlay, always requires a deliberate action. Since the deactivation above all entails a benefit for the medicine manufacturer this merely entails extra expense for the user in the first instance.

SUMMARY

According to various embodiments, a method for authentication of an RFID tag can be specified with an asymmetric cryptography method which guarantees protection against recycling of authentication RFID tags and needs no deactivation of the corresponding RFID tag for this purpose.

According to an embodiment, in a method for authentication of an RFID (Radio Frequency Identification) tag by an RFID reader using a challenge-response protocol in accordance with an asymmetric cryptography method, the RFID tag is assigned a pair of keys with a private and at least one first public key, the key pair is assigned a digital signature for authentication of the first public key, the RFID reader device is authenticated on the basis of the first public key and the digital signature of the RFID tag, wherein the private key is stored on the RFID tag, and the first public key and the digital signature are stored physically separated from the RFID tag and are able to be detected automatically by a data capture device.

According to a further embodiment, the first public key and the digital signature can be stored on a further RFID tag and the data capture device can be an RFID reader. According to a further embodiment, the first public key and the digital signature can be stored in the form of a barcode and the data capture device can be a barcode reader. According to a further embodiment, the authentication of the RFID tag may comprise the following steps: —Determination of the first public key and of the digital signature by the RFID reader, —Checking by the RFID reader of the validity of the first public key on the basis of the digital signature with a second public key of a key issuer, —Generation and wireless transfer of a challenge by the RFID reader, —Determination of a response based on the transferred challenge and the private key and transfer of the response by the RFID tag, —Authentication of the RFID tag by the RFID reader based on the transferred response. According to a further embodiment, a certificate may comprise the first public key and the digital signature.

According to another embodiment, a system for authentication of an RFID tag, an RFID reader and a further data carrier may be configured to carry out an authentication method as described above.

BRIEF DESCRIPTION OF THE DRAWINGS

The invention will be explained in greater detail below with reference to exemplary embodiments and the figures, in which.

DETAILED DESCRIPTION

According to various embodiments, in a method for authentication of an RFID tag by an RFID reader using a challenge-response protocol according to the asymmetric cryptography method, the RFID tag is assigned a pair of keys with a private and at least one first public key. In addition the pair of keys is assigned a digital signature for authentication of the first public key. The RFID reader authenticates the RFID tag on the basis of the first public key and the digital signature. The private key in this case is stored on the RFID tag while the first public key and the digital signature are stored physically separately from the RFID tag and are able to be detected automatically by a data capture device.

Data capture devices, without restricting the generality of this term, are devices for reading out data from data carriers. Data capture devices are for example handwriting readers, mark readers, barcode readers or RFID readers. In the broader sense this also includes software and devices which convert analog signals into digital data, such as scanners for images and text, frame grabbers for videos and voice recognition software for example.

According to an embodiment, the authentication of the RFID tag comprises the following steps: The RFID reader determines the first public key and the digital signature and checks the validity of the first public key on the basis of the digital signature with a second public key of the key issuer. Subsequently the RFID reader generates and transfers a challenge to the RFID tag. The RFID tag determines a response on the basis of the transferred challenge and the private key and transfers this response to the RFID reader. On the basis of the response transferred the RFID reader finally authenticates the RFID tag.

The system according to various embodiments for authentication comprises at least one RFID tag and an RFID reader which are configured to execute the above authentication method.

Figure 1:
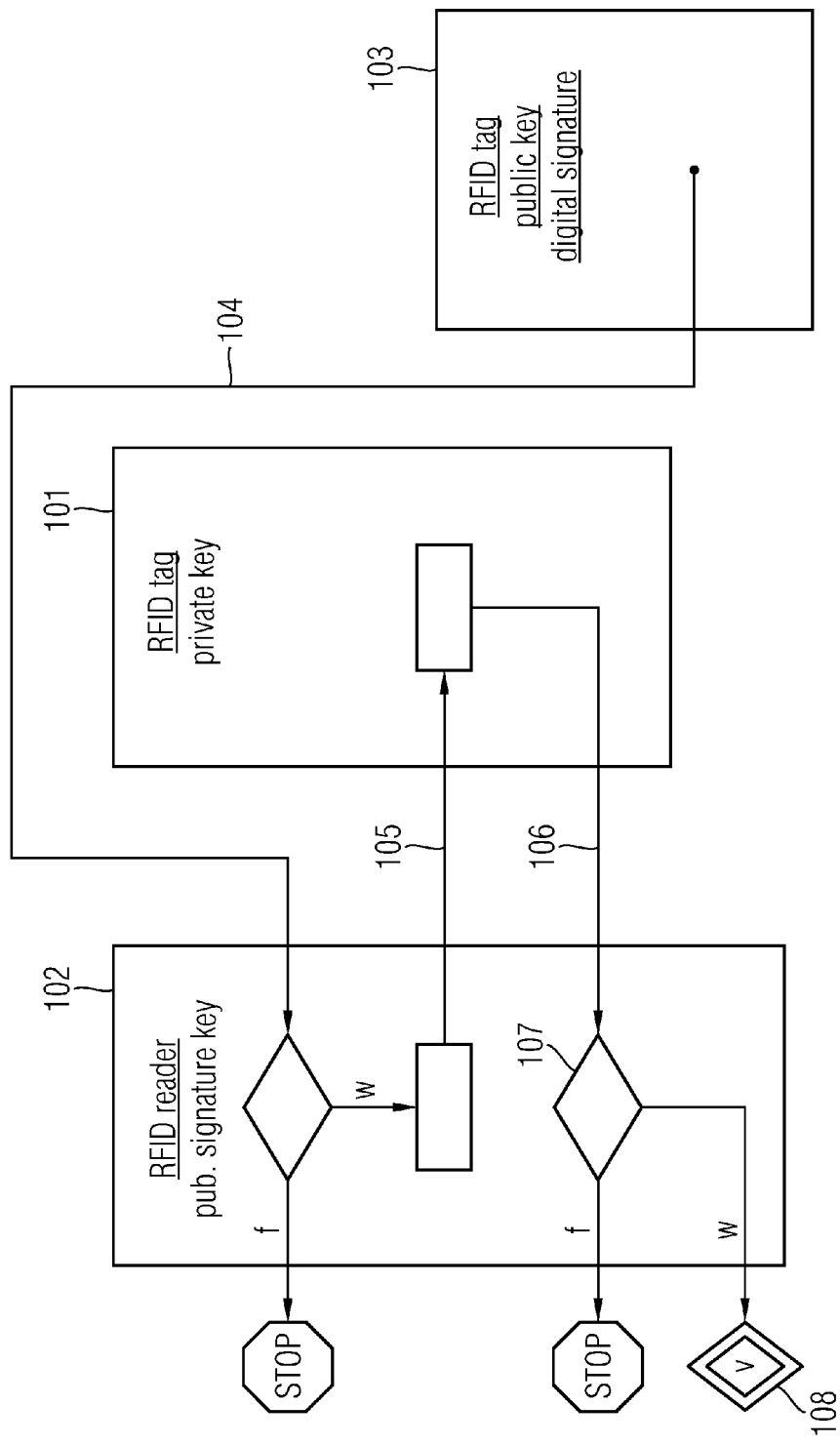
FIG. 1 shows a flowchart of the method for authentication of an RFID tag by an RFID reader.

FIG. 1 shows a flowchart of a method for authentication of an RFID tag 101 by an RFID reader 102 according to various embodiments. In this example the private key is stored on the RFID tag 101 to be authenticated while the public key and the digital signature assigned to the private key are stored on a further RFID tag 103.

By using an asymmetric cryptography method for authenticating an RFID tag the cloning of authentication information can be prevented. The RFID tag is now no longer a pure data memory, the contents of which would in principle be able to be copied and thus cloned. Through the challenge-response protocol the RFID tag automatically performs cryptographic algorithms which require the knowledge of secret key information. In order to be able to produce clones of the RFID tag in this scenario, an attacker must obtain knowledge of this secret key information, but this is stored in the RFID tag and safeguarded by hardware protection measures.

For challenge-response protocols based on symmetrical cryptographic methods the RFID reader would also have to know the secret key information of the RFID chip to carry out the check. This information must either be expensively protected in the RFID reader or the RFID reader must have an online connection to a server on which the secret key is located. When asymmetrical cryptographic methods are used no secret information for performing the check is necessary in the RFID reader. Instead it is sufficient for the RFID reader to know the public key of the asymmetrical key pair consisting of public and private key of the RFID tag to be authenticated. In order to avoid the RFID reader having to store the public keys of all RFID tags to be checked, so-called certificates are generally used. In this certificate both the public key and also a corresponding digital signature is stored with which the validity of the public key can be checked by the recipient of the certificate. The respective certificate is provided for example by an RFID tag to be checked and is made available to the RFID reader on request. In this case for example the individual public keys of the individual RFID tags are digitally signed by the medicine manufacturer, so that to check the validity of a public key, the RFID reader must merely possess the corresponding public signature key of the medicine manufacturer. The validity of the individual public key for the RFID tag is then checked which is initially read out from the RFID tag. Subsequently the RFID tag verifies with the RFID reader, using the challenge-response protocol, that it possesses the associated private key.

A possible sequence of the method is shown in FIG. 1. Initially the RFID reader 102 receives from the further RFID tag 103 the public key and the signature 104 of the RFID tag 101 to be checked. This signature is now checked by the RFID reader 102 with the aid of the public key of the medicine manufacturer. If the certificate obtained is valid, a challenge is generated by the RFID reader 102 and is transferred 105 to the RFID tag 101. The RFID tag 101 in its turn generates a response based on its private key and the challenge received 106. The response determined is transferred in its turn to the RFID reader 102. With the aid of the public key of the RFID tag 101 to be checked, which the RFID reader 102 has determined from the certificate, the RFID reader 102 now checks the response received. If the response was correctly formed the RFID tag 101 has verified to the RFID reader 102 its knowledge of the necessary secret key information for forming the response by this and is accepted as authentic 108.

The decisive advantage with the asymmetric authentication method lies in the fact that any given RFID reader can check the authenticity of the RFID chip if it possesses the public signature key of the brand manufacturer. In decentralized infrastructures in particular this provides a simple opportunity for verifying the validity of RFID tags and thus also of the product without transactions having to be carried out online and without expensive key management having to be present.

The certificate of an RFID tag to be checked is now not stored on this RFID tag but is stored physically separated from this RFID tag. Initially the RFID reader reads the certificate of the RFID tag to be checked before the challenge-response protocol is carried out successfully with the RFID tag to be checked. Consequently an RFID tag for authentication can only then be used again if the certificate for this RFID tag is known.

By separating certificate and RFID tag to be checked the likelihood of an RFID tag being able to be employed again after use is decreased. A product counterfeiter is forced to obtain the corresponding certificate first of all. Once certificate and associated RFID tag are separated, for example by paper or other rubbish, the assignment has disappeared and the effort of assigning a found certificate to a found RFID tag again increases accordingly.

Figure 2:
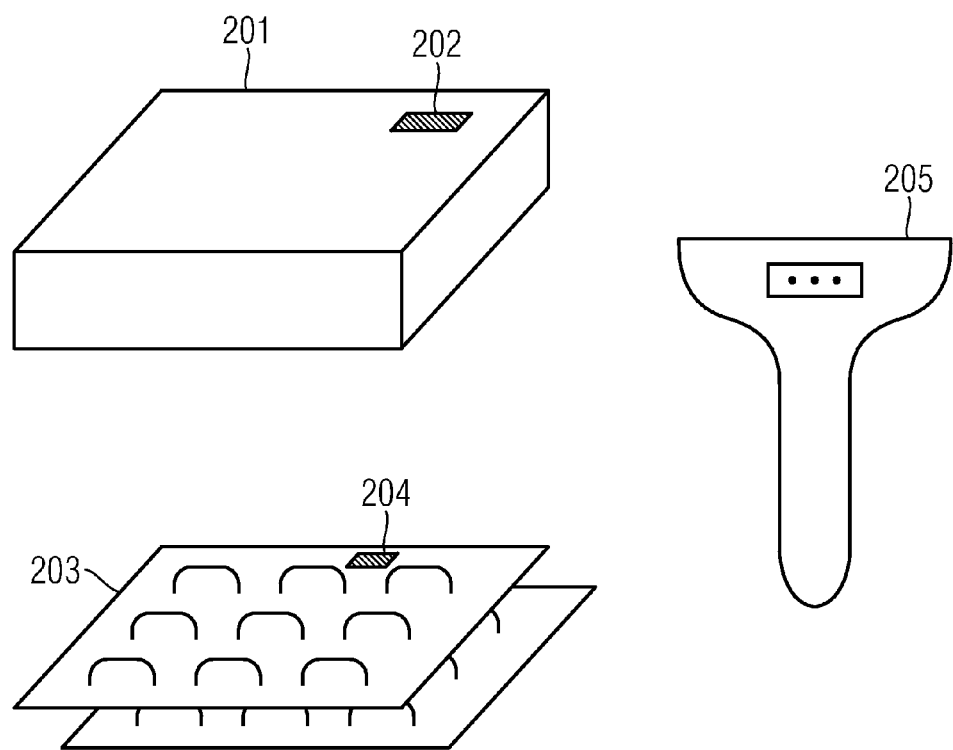
FIG. 2 shows an example of an application of the system according to various embodiments.

An example of an application according to an embodiment is shown in FIG. 2. A packet of medicines 201 contains two blisters which are each equipped with an RFID tag for authentication. The two RFID tags each have the private key for the authentication. The associated certificates, comprising the respective public key and digital signatures, are not on the respective RFID tag 204 but are attached to the packaging of the medicines. For successful authentication by the RFID reader 205, the RFID tag 204 with the private key and the RFID tag on the packaging 202 with the associated public key must thus be present in each case.

In a further embodiment the certificate is printed in a two-dimensional barcode on the packaging and must be read by means of the barcode scanner before authentication.

In a further embodiment the certificate of the first blister RFID tag is stored in the second blister RFID tag in the certificate of the second blister RFID tag in the first blister RFID tag. A medicine can then be successfully authenticated if all blisters are in the packaging. For a product counterfeiter this means that he would have to use the two corresponding blisters at once to counterfeit a product.

What is claimed is:

1. A method for authentication of an RFID (Radio Frequency Identification) tag by an RFID reader using a challenge-response protocol in accordance with an asymmetric cryptography method, the method comprising:
   assigning to the RFID tag a pair of keys with a private key and at least one first public key,
   assigning to the key pair a digital signature for authentication of the first public key,
   wherein the private key is stored on the RFID tag, and
   wherein the first public key and the digital signature are stored in memory physically separated from the RFID tag, but not stored on the RFID tag, and are automatically detectable by a data capture device,
   the RFID reader device authenticating the RFID tag by a process including:
      the RFID reader accessing the first public key and the digital signature from the memory physically separated from the RFID tag, such that the first public key and the digital signature remain separate from the RFID tag,
      the RFID reader checking the validity of the first public key based on the digital signature accessed from the memory physically separated from the RFID tag and a second public key of a key issuer known by the RFID reader,
      the RFID reader generating and wirelessly transferring a challenge to the RFID tag,
      the RFID reader receiving from the RFID tag a response to the transferred challenge, the response based on the transferred challenge and the private key, and
      the RFID reader authenticating the RFID tag based on the transferred response received from the RFID tag and the public key authenticated using the digital signature accessed from the memory physically separated from the RFID tag.

2. The method according to claim 1, wherein:
   the first public key and the digital signature are stored on a further RFID tag and
   the data capture device comprises an RFID reader, such that the RFID reader directly accesses the first public key and the digital signature from the memory physically separated from the RFID tag.

3. The method according to claim 1, wherein:
   the first public key and the digital signature are stored in the form of a barcode and
   the data capture device comprises a barcode reader, and
   the RFID reader indirectly accesses the first public key and the digital signature from the memory physically separated from the RFID tag via the barcode reader.

4. The method according to claim 1, comprising a certificate comprising the first public key and the digital signature.

5. A system for authentication of a first RFID tag, the system comprising:
   a second RFID tag physically separated from the first RFID tag, and
   an RFID reader configured to:
      assign to the first RFID tag a pair of keys with a private key and a first public key,
      assign to the key pair a digital signature for authentication of the first public key,
      wherein the private key is stored on the first RFID tag, and
      wherein the first public key and the digital signature are stored on the second RFID tag physically separated from the first RFID tag, but not stored on the first RFID tag, and are automatically detectable by a data capture device, and
      authenticate the first RFID tag by:
         accessing the first public key and the digital signature from the second RFID tag physically separated from the first RFID tag, such that the first public key and the digital signature remain separate from the first RFID tag,
         checking the validity of the first public key based on the digital signature accessed from the second RFID tag and a second public key of a key issuer known by the RFID reader,
         generating and wirelessly transferring a challenge to the first RFID tag,
         receiving from the first RFID tag a response to the transferred challenge, the response based on the transferred challenge and the private key, and
         authenticating the first RFID tag based on the transferred response received from the RFID tag and the public key authenticated using the digital signature accessed from the memory physically separated from the RFID tag.

6. The system according to claim 5, wherein the data capture device comprises an RFID reader configured to directly access the first public key and the digital signature from the memory physically separated from the RFID tag.

7. The system according to claim 5, wherein:
   the first public key and the digital signature are stored in the form of a barcode and
   the data capture device comprises a barcode reader, and
   the RFID reader is configured to indirectly access the first public key and the digital signature from the memory physically separated from the RFID tag via the barcode reader.

8. The system according to claim 5, comprising a certificate comprising the first public key and the digital signature.

9. An RFID reader device for authentication of an RFID tag, the RFID reader device comprising logic instructions stored in non-transitory computer-readable media and executable by a processor to:
   assign to an RFID tag a pair of keys with a private and at least one first public key, and
   assign to the key pair a digital signature for authentication of the first public key, wherein the private key is stored on the RFID tag, and wherein the first public key and the digital signature are stored in memory physically separated from the RFID tag, but not stored on the RFID tag, and are automatically detectable by a data capture device, and
   authenticate the RFID tag by:
      accessing the first public key and the digital signature from the memory physically separated from the RFID tag, such that the first public key and the digital signature remain separate from the RFID tag,
      checking the validity of the first public key based on the digital signature accessed from the memory physically separated from the RFID tag and a second public key of a key issuer known by the RFID reader,
      generating and wirelessly transferring a challenge to the RFID tag, receiving from the RFID tag a response to the transferred challenge, the response based on the transferred challenge and the private key, and authenticating the RFID tag based on the transferred response received from the RFID tag and the public key authenticated using the digital signature accessed from the memory physically separated from the RFID tag.

10. The RFID reader device according to claim 9, wherein:

the first public key and the digital signature are stored on a further RFID tag and the data capture device comprises an RFID reader configured to directly access the first public key and the digital signature from the memory physically separated from the RFID tag.

11. The RFID reader device according to claim 9, wherein:

the first public key and the digital signature are stored in the form of a barcode and the data capture device comprises a barcode reader, and the RFID reader is configured to indirectly access the first public key and the digital signature from the memory physically separated from the RFID tag via the barcode reader.

12. The RFID reader device according to claim 9, wherein a certificate comprises the first public key and the digital signature.

* * * * *